US010642764B1

(12) United States Patent
Gerhart et al.

(10) Patent No.: US 10,642,764 B1
(45) Date of Patent: May 5, 2020

(54) DATA TRANSFER COMMAND LATENCY OF A HOST DEVICE

(71) Applicant: Western Digital Technologies, Inc., San Jose, CA (US)

(72) Inventors: Darin Edward Gerhart, Oronoco, MN (US); Nicholas Edward Ortmeier, Rochester, MN (US); Cory Lappi, Rochester, MN (US); William Jared Walker, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 11 days.

(21) Appl. No.: 16/290,705

(22) Filed: Mar. 1, 2019

(51) Int. Cl.
*G06F 13/20* (2006.01)
*G06F 13/42* (2006.01)
*G06F 12/10* (2016.01)

(52) U.S. Cl.
CPC .............. *G06F 13/20* (2013.01); *G06F 12/10* (2013.01); *G06F 13/4282* (2013.01); *G06F 2212/657* (2013.01); *G06F 2213/0036* (2013.01)

(58) Field of Classification Search
None
See application file for complete search history.

(56) References Cited

U.S. PATENT DOCUMENTS

| | | | | |
|---|---|---|---|---|
| 9,829,957 | B2 * | 11/2017 | Yasin | G06F 1/3243 |
| 10,254,970 | B1 * | 4/2019 | Martin | G06F 3/0611 |
| 2009/0259749 | A1 * | 10/2009 | Barrett | G06F 11/3495 709/224 |
| 2012/0054329 | A1 * | 3/2012 | Gulati | H04L 67/1002 709/224 |
| 2013/0124267 | A1 * | 5/2013 | O'Sullivan | G06Q 30/06 705/7.36 |
| 2013/0312005 | A1 * | 11/2013 | Chiu | G06F 3/061 718/105 |
| 2015/0020078 | A1 * | 1/2015 | Kuesel | G06F 9/4881 718/105 |
| 2015/0149462 | A1 * | 5/2015 | Biyani | G06F 16/35 707/737 |
| 2015/0293997 | A1 * | 10/2015 | Smith | G06F 16/95 707/749 |
| 2016/0299697 | A1 * | 10/2016 | Chen | G06F 3/0611 |
| 2016/0300252 | A1 * | 10/2016 | Frank | G06Q 30/0203 |
| 2017/0177222 | A1 * | 6/2017 | Singh | G06F 3/061 |
| 2018/0067844 | A1 * | 3/2018 | Conti | G06F 11/3664 |
| 2018/0273064 | A1 * | 9/2018 | Brooks | B61L 27/0022 |
| 2019/0312772 | A1 * | 10/2019 | Zhao | G06N 3/08 |

\* cited by examiner

*Primary Examiner* — Henry Tsai
*Assistant Examiner* — Christopher A Bartels
(74) *Attorney, Agent, or Firm* — Rowan TELS LLC

(57) ABSTRACT

An input/output device identifies a workload type for a connected host device. The input/output device applies settings for the workload type to affect one or more of a flash translation layer queue depth of the input/output device, a host device data transfer scheduler of the input/output device, and a command status host notification timing by the input/output device to the host device.

15 Claims, 6 Drawing Sheets

DATA TRANSFER COMMAND LATENCY OF A HOST DEVICE

BACKGROUND

A host device typically utilizes one or more input/output devices for functions such as data storage and retrieval. Examples of host devices are desktop computers, laptop computers, tablet devices, network servers, mobile phones, network equipment such as routers and switches, and many others. Example input/output devices are solid state drives (SSD) and other types of memory devices, printers, and scanners, to name just a few.

A host device that utilizes one or more input/output devices has an overall system input/output latency that is a function of both the host device latency and the input/output device latency. The input/output device latency is a major component of overall system input/output latency, and while the host device latency is often carefully controlled to ensure no system bottlenecks and "perfect host" performance, it is less understood how host device latency varies based on inconsistent input/output device latency.

Perfect hosts do not exist in the real world for all host device workloads. Host device latency may be affected by a number of factors including command execution status and command turnaround time each of which affects effective command queue depth. An example of input/output device latency is the time it takes between submission and completion of a write data request by the host device. Host device latency is also affected by how efficiently the host device utilizes Serial Attached SCSI links to the input/output device, for example, utilizing the Serial Attached SCSI links to provide credit, establish persistent connections, and utilize full duplex.

BRIEF SUMMARY

Embodiments of input/output devices are described, including a solid state drive that identifies a workload type for a connected host device and improves host performance attributes for the workload type by modifying settings for one or more of a flash translation layer queue depth of the solid state drive, a host device data transfer scheduler of the solid state drive, and a command status host notification timing by the solid state drive to the host device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
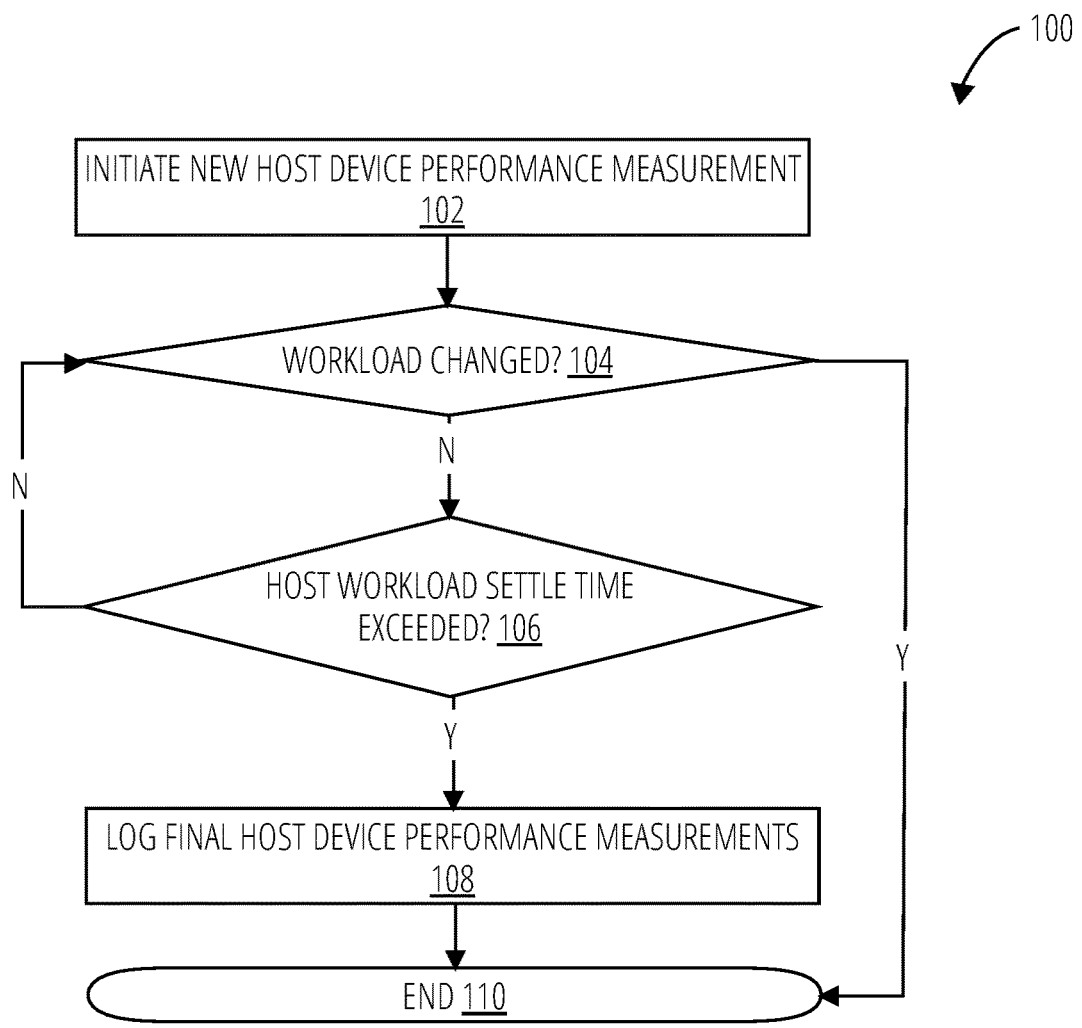
FIG. 1 illustrates a workload execution profile process 100 in accordance with one embodiment.

Host device latency due to expected input/output device latency may be mitigated and tuned using models of input/output device behavior for specific host device workloads. The input/output devices are designed assuming a perfect host with the goal of minimizing overall system input/output latency and maximizing input/output data throughput (e.g., be as fast and responsive to host device data transfer commands as possible). Input and output devices designed in this manner typically do not account for how changes in input/output device latency and the host device workload execution profile may affect host device latency. For example, overall system input/output latency may degrade if the host fails to maintain effective command queue depth to the input/output device due to oscillation between the command bursting and data bursting phases.

Solid state drives may control the following attributes that affect host device latency:

1. The flash translation layer effective queue depth, which is the number of host device data transfer commands the flash translation layer of the input/output device is concurrently processing, which affects both per command latency and the overall system input/output latency;
2. The scheduling of host data transfers during execution of previous host commands on the input/output device, and more particularly the timing of when write data requests and read data requests from the host device are executed by the input/output device; and
3. The command status host notification timing, which is the timing of an acknowledgement from the input/output device to the host device indicating that a host device data transfer command has completed, which may lower queue depth and trigger the host device to send a new command to maintain a desired queue depth.

The complexity of creating an accurate input/output device model increases when there are multiple input/output data transfer ports between the host device and the input/output device. Further complicating the modeling of the input/output device are implementations in which multiple host device command initiators (i.e., devices or processes of the host device that send host device data transfer commands) may be present and may share one or more Serial Attached SCSI links. Multiple narrow ports and/or wide port connections further complicate the modelling of the input/output device.

Thus a more realistic and flexible approach to improving overall system input/output latency between a host device and input/output devices is to enable the input/output devices with a real-time mechanism to adjust the attributes under their control to improve host device latency and thus improve overall system input/output latency.

Disclosed herein are mechanisms for input/output devices to utilize a workload execution profiler to assess the performance of a host device and make adjustments to certain attributes of the input/output device related to host device command processing to affect the host device execution efficiency, and thus the host device latency and overall system input/output latency. The workload execution profiler may be utilized by the input/output device to determine a "host device perfection factor" and to perform a workload type lock on a specific host device workload.

Referring to FIG. 1, a workload execution profile process 100 initiates a new host device performance measurement (block 102). The new host device performance measurement may be initiated by receiving a control signal based on a workload type lock (or global workload info if workload type lock is not achieved) or in response to an Imperfect Serial Attached SCSI Host Workload Optimizer (ISHWO)

governor adjusting device performance controls (e.g., flash translation layer queue depth, data transfer delay, or command status delay). The workload execution profile process 100 may receive a host performance measurement duration and host perfection factor inputs from an ISHWO mode page. The ISHWO mode page is a configurable set of information that is utilized for this process, as well as other processes. The host perfection factor inputs may determine the host performance attributes to be received from one or more physical layers. Exemplary host performance attributes include command turnaround time (ns), host data turnaround time (ns), command-to-command turnaround time (ns), open connection time (ns), and Serial Attached SCSI credit turnaround time (ns). The command turnaround time is the time an input/output device waits for new command from a host device following a status being returned. The host data turnaround time is the time the input/output device waits for write data to be supplied from an initiator after a transfer ready request has been sent to the initiator. The command-to-command turnaround time is the time between commands issued by the initiator. The open connection time is the time the input/output device needs to establish connections with the host device (e.g., the time for the host device to respond with open accept), which is intended to account for any link arbitration delays experienced by the device including open reject retries and expander delays, e.g., arbitration-in-process (AIP). The Serial Attached SCSI credit turnaround time is the time a device is waiting for credit during an open connection.

The workload execution profile process 100 then determines whether the workload type has changed (decision block 104). Whether a workload type has changed may be based on a command stream from the host. The determination that the host device workload type has changed may be due to changes in factors including: command types, a command frequency, a percent random, a transfer length, a number of initiators, a number of I/O ports in use, types of I/O ports in use, etc. The determination that the host device workload type has changed may be performed by an ISHWO workload detector or an ISHWO host device performance monitor. If the workload type has not changed, the workload execution profile process 100 determines whether a host workload settle time has been exceeded (decision block 106). The host workload settle time is a host-defined threshold value for when the host device workload is locked and a valid performance measurement may be obtained. If the workload settle time has not been exceeded, the workload execution profile process 100 re-determines whether the workload type has changed at decision block 104.

If the host workload settle time has been exceeded, final host device performance measurements that were captured during the workload settle time duration are logged (block 108). The host workload settle time duration is a time (e.g., in 100 ms increments) that an ISHWO host performance monitor is to spend measuring the host performance attributes. Average values for each of the host performance attributes are determined. The final host device performance measurements are recorded in a log file, which may be utilized for future learning. If the workload type has changed or once the final host device performance measurements are logged, the workload execution profile process 100 ends (done block 110). If the workload execution profile process 100 determines the workload type has changed, a control signal may be sent to the ISHWO workload detector to determine the new workload type.

The workload execution profile process 100 may be executed on the solid state drive. A Command Performance Statistics Monitor located on the solid state drive may be configured to perform the above performance measurement operations (i.e., the Command Performance Statistics Monitor running on the solid state drive). The host performance data may be logged and tracked separately for each initiator for each host performance measurement iteration.

Figure 2:
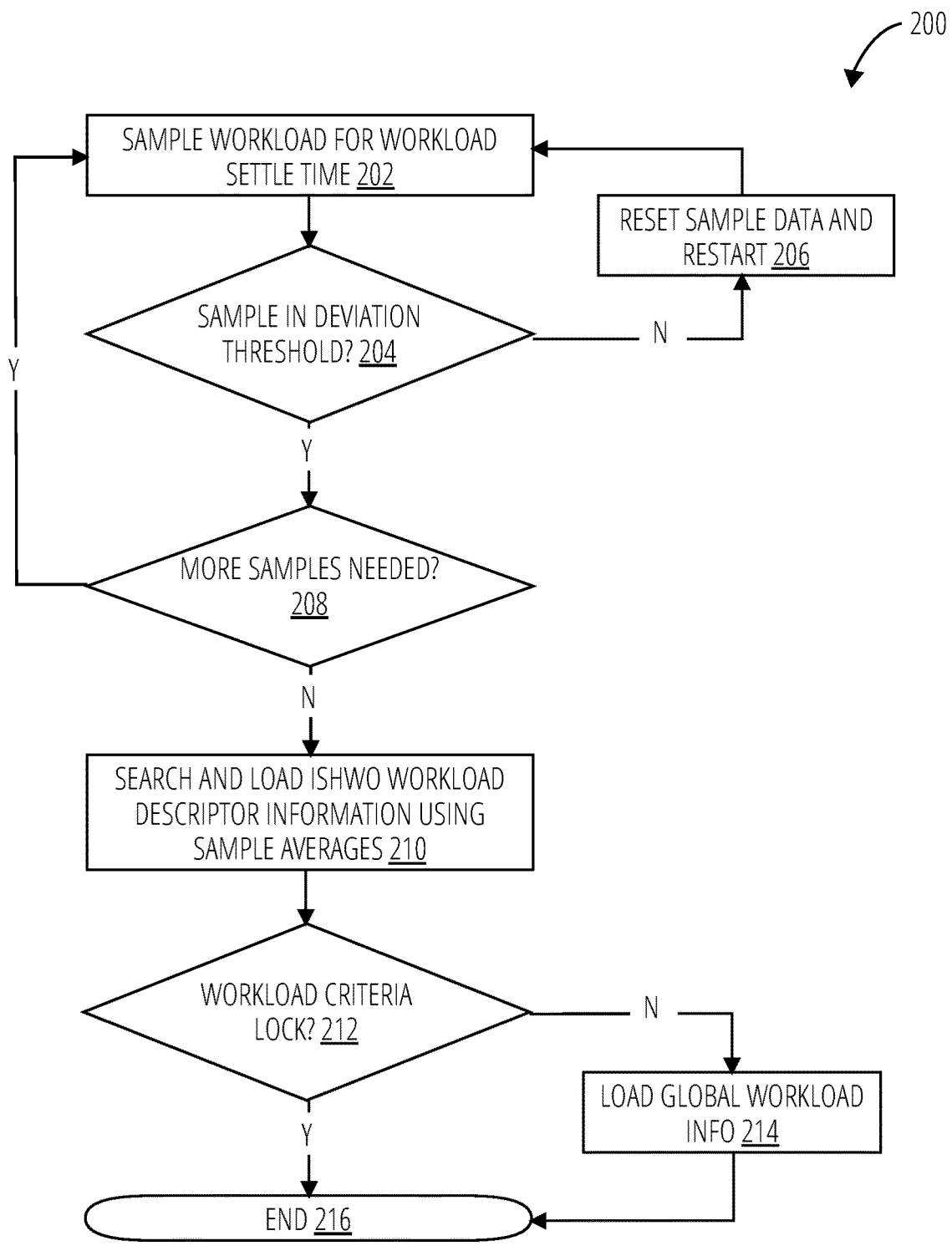
FIG. 2 illustrates a workload execution profile process 200 in accordance with one embodiment.

Referring to FIG. 2, a workload execution profile process 200 samples a workload for workload settle time (block 202). The workload execution profile process 200 may receive workload attributes including a percentage read, a queue depth, a percentage random, a transfer length, an initiator count, a port count, and input/outputs per second (IOPS). The percentage read is the percentage of media commands that result in read operations to a NAND. The queue depth is the number of queued commands over the sample period. The percentage random is the percentage of received commands that have a non-sequential start logical block address (LBA). This may be relative to the command reception order. The transfer length is the number of blocks per each command where workloads with random transfer lengths are designated with a well known value (e.g., 0). The initiator count is the number of initiators issuing commands. The port count is the number of ports the host device is using to issue media commands. The TOPS is the media I/O per second performance measurement over the workload settle time. Each workload attribute may then be averaged. The workload settle time may be received from the ISHWO mode page and is a time (e.g., in 100 ms increments) that the workload is to be monitored. The monitoring may be performed by the ISHWO workload detector, which may interact with the Command Performance Statistics Monitor.

The workload execution profile process 200 then determines whether the sample is within a deviation threshold (decision block 204). The workload sample deviation threshold is a standard deviation threshold permitted across the measured workload attributes for the collected samples to constitute a consistent workload. The workload sample deviation threshold may be received from the ISHWO mode page. If the workload sample is not within the workload sample deviation threshold, the sample data is reset and the workload execution profile process 200 is restarted (block 206). In some embodiments, previously obtained workload samples are not retained and the current workload sample that is not within the workload sample deviation threshold is not retained. In other embodiments, the previous workload samples are retained, while the current workload sample is not retained. The sample data may also be reset and the workload execution profile process 200 restarted if there is a change to the workload type. Furthermore, the sample data may also be reset and the workload execution profile process 200 restarted if there are any changes to the initiator count or port count that results in sample data reset and start of new workload lock attempt. Other workload attributes may utilize the workload sample deviation threshold.

If the workload sample is within the workload sample deviation threshold, the workload execution profile process 200 determines whether more workload samples are needed (decision block 208). The workload sample count is the number of contiguous workload samples to be received (e.g., by the ISHWO workload detector) before evaluating lock criteria for a specific workload type. The workload sample count is received from the ISWHO mode page (e.g., a memory data structure). If the number of contiguous workload samples does not exceed the workload sample count, the workload execution profile process 200 samples a workload for workload settle time at block 202.

If the number of contiguous workload samples exceeds the workload sample count, ISHWO workload descriptor information is searched and loaded using the workload sample averages (block 210). The sample averages calculated above are utilized and workload IDs are searched for the closest matching fixed workload (e.g., utilizing a nearest distance function). Exemplary fixed workloads may include 0x0000, a global workload ID that is applied when there are no other valid matching workload IDs; 0x00XX (0x0001-0x00FF), low byte workload IDs reserved for read workloads including, but not limited to: 0x0001 (QD=1, Transfer Length=1, Random Start LBA), 0x0002 (QD=2, Transfer Length=1, Random Start LBA), 0x0018 (QD=32, Transfer Length=128, Random Start LBA), and 0x0080 (QD=1, Transfer Length=8, Sequential Start LBA); and 0xXX00, high byte workload IDs reserved for write workloads. The ISHWO mode page may comprise one or more workload descriptors. Each workload descriptor includes the workload ID, a descriptor length, a valid indication, a workload detector lock criteria, and a host device perfection factor. The workload ID is an identification number that aligns to a specific workload that the ISHWO workload detector may detect. The valid indication indicates whether the descriptor contents for the workload ID should be utilized or not (i.e., whether the data has been selected or not). The workload detector lock criteria is a percent threshold for the amount of deviation the ISHWO workload detector should permit when detecting a workload. The host device perfection factor is a percent threshold for the amount of deviation from perfect host performance an ISHWO governor should permit before disabling further host adjustments.

Once a host device workload type is selected, the workload execution profile process 200 determines whether there is a workload criteria lock (decision block 212). This is a definitive determination of host device workload type. The workload execution profile process 200 determines if the sample averages are within the workload detector lock criteria percentage for that fixed workload ID. If not, the global workload info is loaded (block 214). The global workload ID is utilized if lock is not achieved on a specific workload ID. Once a workload type lock occurs or the global workload ID is selected to be utilized, the workload execution profile process 200 ends (done block 216). The workload type lock or utilization of the global workload ID may initiate the workload execution profile process 100. The workload execution profile process 200 may continue to execute to determine whether the workload type has changed. Such a change may result in a control signal being sent to re-initiate the workload execution profile process 100 for the new workload type. A control signal may also be sent to the ISHWO governor that includes the host device perfection factor. The host device perfection factor may also be sent to the ISHWO host device performance monitor, which may then send the host device perfection factor to the ISHWO governor.

The workload execution profile process 200 may be executed on the solid state drive. A Command Performance Statistics Monitor located on the solid state drive may be configured to perform the above operations (i.e., the Command Performance Statistics Monitor running on the solid state drive).

Figure 3:
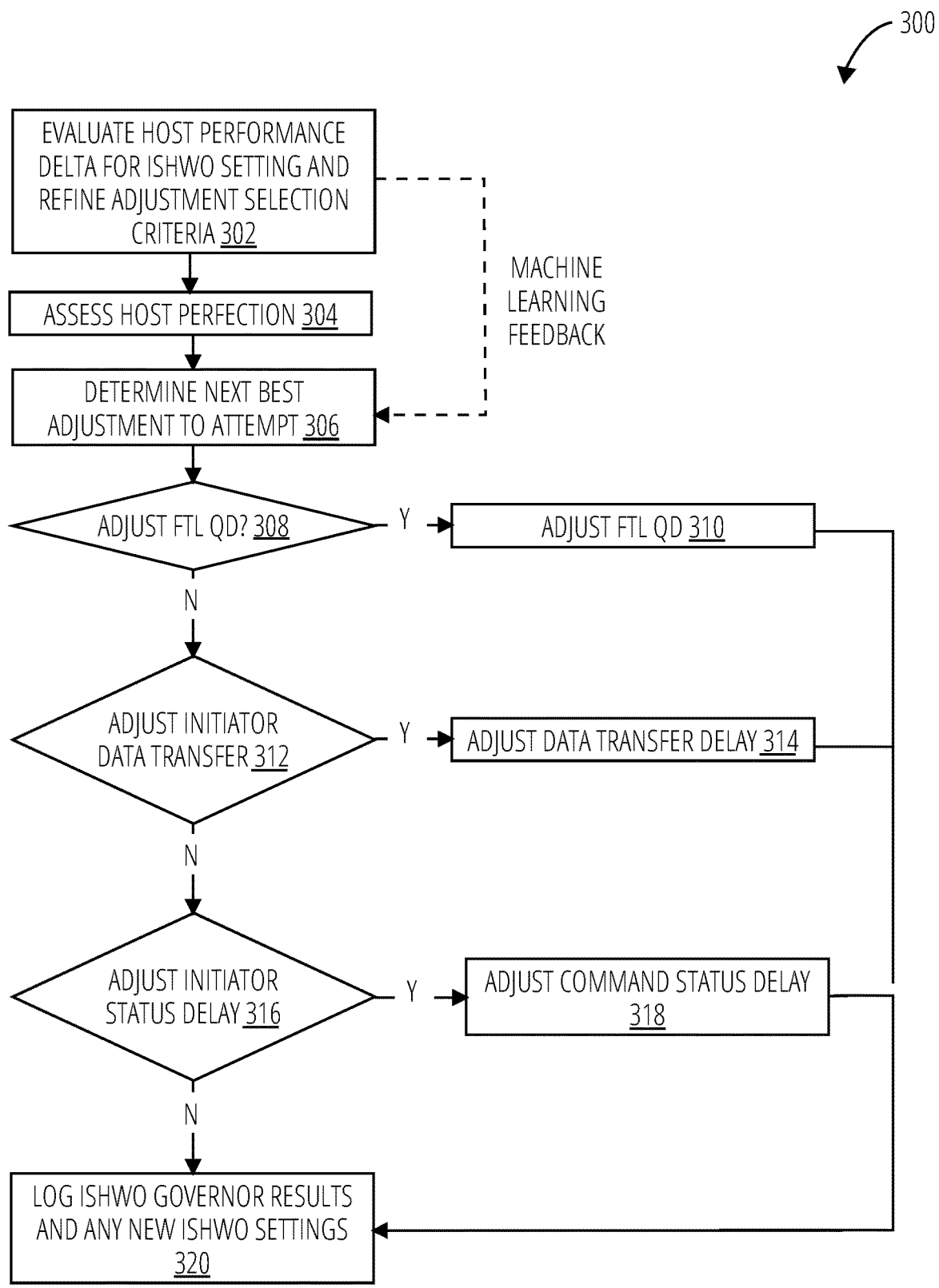
FIG. 3 illustrates an input/output device control process 300 in accordance with one embodiment.

Referring to FIG. 3, an input/output device control process 300 evaluates a host performance delta for ISHWO settings and refines an adjustment selection criteria (block 302). A host device workload optimizer may be compared to an imperfect Serial Attached SCSI host device workload optimizer. An error function may be utilized to measure the difference between the actual performance measured and an optimal performance. The actual performance may include the final host device performance measurements that have been logged and recorded and the averaged workload attributes generated by the workload execution profile process 100 and the workload execution profile process 200, respectively. Changes in the host performance determined utilizing the host performance measurement log relative to the changes in the prior device performance control settings (utilizing the ISHWO governor log) are evaluated and scored, and weights utilized for selection of future drive control adjustments are adjusted. The host perfection is then assessed (block 304). The host device perfection factor, a host device workload configured threshold, which is obtained from the ISHWO mode page is compared (e.g., by an error function) with a host perfection evaluation. Host perfection evaluation is performed for each initiator utilizing any variety of ranking mechanisms on the host performance measurement data set (e.g., raw mean, weighted average, fuzzy weighted average). In one example approach, the host perfection score is given by Equation 1:

$$\text{Host perfect score} = (W1*A1) + (W2*A2) + \ldots + (Wn*An) \quad \text{Equation 1}$$

where A1, A2, ..., and A are host measurement attributes (e.g., average command turnaround time, average command-to-command turnaround time, average open connection time, etc.) and W1, W2, ..., and Wn are relative weight factors applied to each measurement. The sum of all the weights may equal 100%. Each host perfection score is evaluated against the host device perfection factor for the current workload ID to determine if the host device is within the desired perfection goal. Perfect host devices are assumed to have zero turn-around times or delays.

The next best adjustment to attempt is then determined (block 306). The next best adjustment may be determined utilizing machine learning techniques known in the art, such as unsupervised or semi- or fully-supervised machine learning. The output is what to adjust and by how much. Drive performance control adjustment selection may be performed utilizing weighted host perfection scores and results of previous performance control adjustments. A first determination may be whether to alter the global effective flash translation layer Queue Depth (QD), or queue depth, to affect host performance for all initiators based on the host perfection scores. A second determination is whether individual initiator delays for host data transfers or command status responses should be altered per the individual host perfection scores. The weights utilized to select drive performance control adjustments are evaluated and adjusted by the ISHWO governor during each iteration based on the control effectiveness.

The input/output device control process 300 then determines whether the flash translation layer queue depth is to be adjusted (decision block 308). If so, the flash translation layer queue depth is adjusted (block 310). A control signal may be sent to a serializer or an FTL/FM subsystem to adjust a flash translation layer queue depth. Such an adjustment throttles the number of commands being processed concurrently. This affects a global control that sets the maximum outstanding flash translation layer queue depth used to affect overall device performance for all initiators.

If the flash translation layer queue depth is not to be adjusted, the input/output device control process 300 determines whether an initiator data transfer is to be adjusted (decision block 312). If so, the data transfer delay is adjusted (block 314). This may be performed for one or more initiators. A host device command initiator may also be referred to as a host device process. Each host device process may be assigned its own command queue and direct memory access data path engine queue. A control signal may be sent to a Serial Attached SCSI direct memory access data path engine queue to alter the one or more command queues for the affected host device command initiators. A host data transfer delay is a per initiator control to delay data transfers for commands associated with the target initiator.

If the initiator data transfer is not to be adjusted, the input/output device control process 300 determines whether the initiator command status delay is to be adjusted (decision block 316). If so, the command status delay is adjusted (block 318). The command status delay is the latency (delay) before acknowledging command completion. A control signal may be sent to the Serial Attached SCSI direct memory access data path engine queue to alter the command status delay for the affected host device command initiators. A command status delay is a per initiator control to delay response frames for commands associated with the target initiator.

Depending on the embodiment, each adjustment may be made only on condition that the prior adjustment in the sequence is made. In other embodiments, each adjustment is determined independently of the other adjustments. Although described in a preferred order, the invention is not limited to a particular order of the adjustments in all embodiments.

Once the flash translation layer queue depth is adjusted, the data transfer delay is adjusted, the command status delay is adjusted, or no adjustments are made, the ISHWO governor results and any new ISHWO settings are logged (block 320). The log may be recorded and applied to future learning. Such a logging may also initiate a new host device performance measurement. In some embodiments, a new host device performance measurement is initiated if an adjustment is made.

In some embodiments, input/output device adjustments may be prioritized in a different order. In yet other embodiments, multiple input/output device attributes (e.g., the flash translation layer queue depth and the data transfer delay, the data transfer delay and the command status delay, etc.) may be adjusted during the input/output device control process 300.

The input/output device control process 300 may be executed on the solid state drive. A Command Performance Statistics Monitor located on the solid state drive may be configured to perform the above operations (i.e., the Command Performance Statistics Monitor running on the solid state drive).

Figure 4:
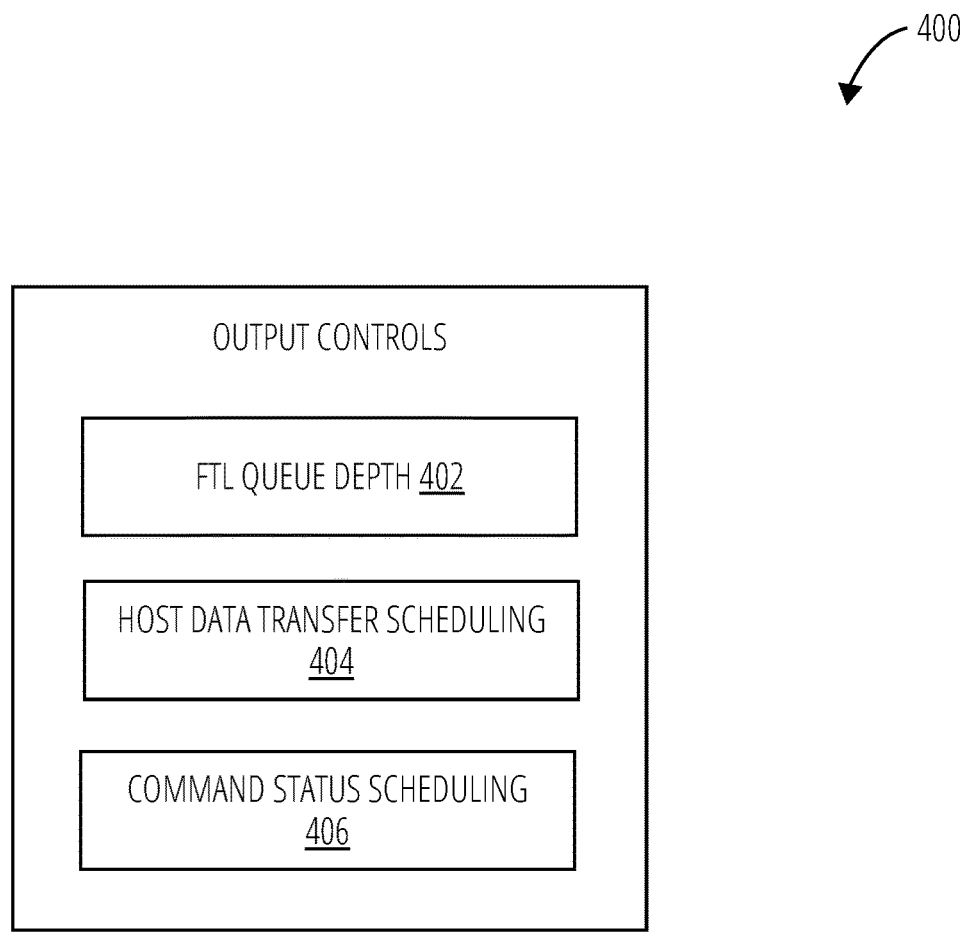
FIG. 4 illustrates an input/output device controls 400 in accordance with one embodiment.

Referring to FIG. 4, input/output device controls 400 are depicted. The input/output device controls 400 are internal signals of the solid state drive and may not be output to the host device. The input/output device controls 400 include the FTL queue depth 402, the host data transfer scheduling 404, and the command status scheduling 406.

The FTL queue depth 402 affects the flash translation layer effective queue depth. That is, the number of commands the flash translation layer (FTL) is concurrently processing is altered, which affects both per command latencies and overall device performance. The FTL queue depth 402 may be altered by an ISHWO governor sending a control signal to a serializer or an FTL/FM subsystem.

The host data transfer scheduling 404 affects the scheduling of host device data transfers, such as by a host device data transfer scheduler. The timing of when write data requests are sent to the host device or when read data transfers are initiated is thus altered. The host data transfer scheduling 404 may be altered by an ISHWO governor sending a control signal to a Serial Attached SCSI direct memory access data path engine queue.

The command status scheduling 406 affects the command status timing, such as the command status host notification timing. The command completion time is altered, which lowers queue depth and triggers the host device to send a new command. This maintains the desired queue depth. The command status scheduling 406 may be altered by an ISHWO governor sending a control signal to a Serial Attached SCSI direct memory access data path engine queue.

Figure 5:
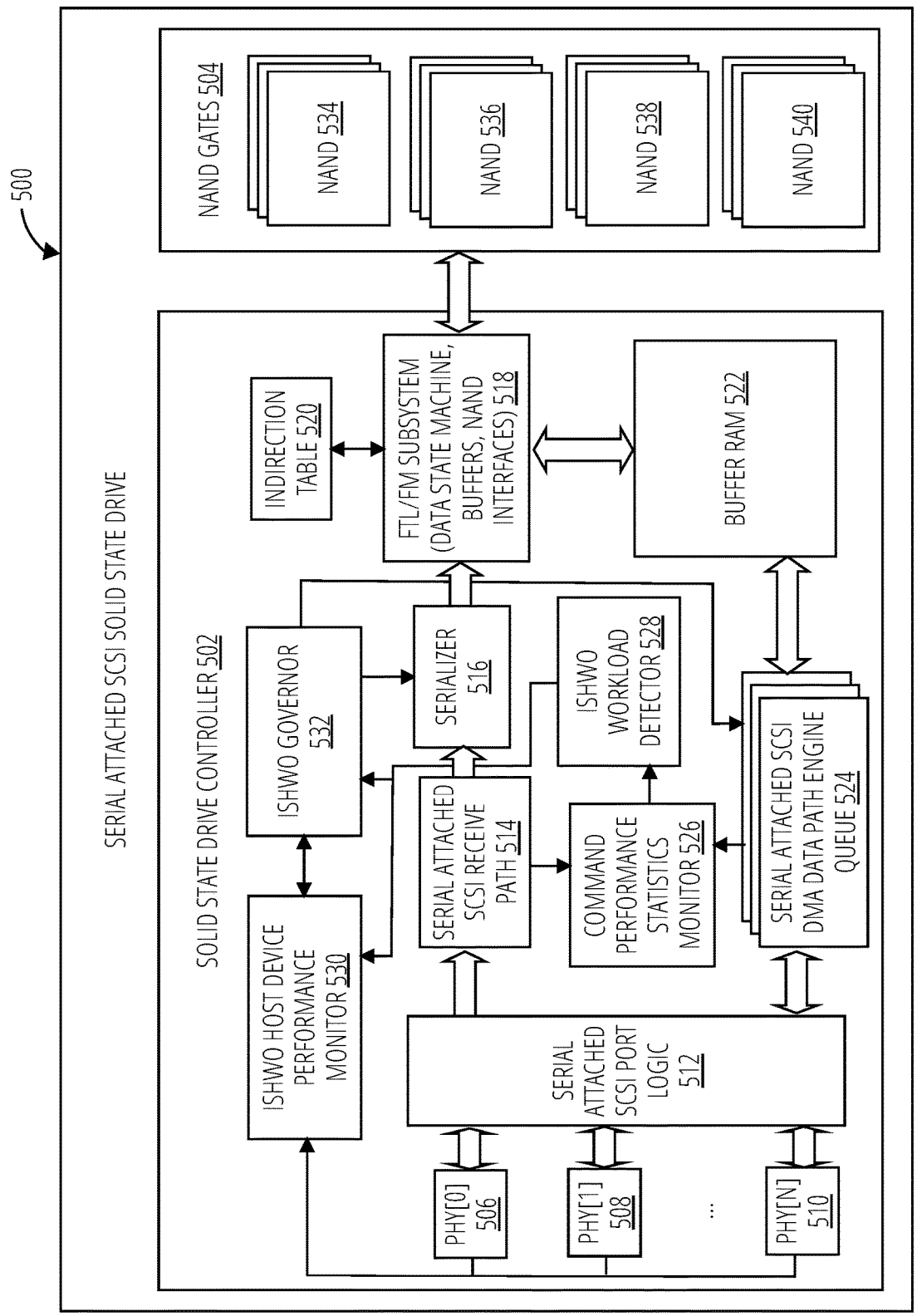
FIG. 5 illustrates a solid state drive 500 in accordance with one embodiment.

Referring to FIG. 5, a solid state drive 500 comprises a solid state drive controller 502 and NAND gates 504. The solid state drive controller 502 includes a physical layer 506, a physical layer 508, a physical layer 510, a Serial Attached SCSI port logic 512, a Serial Attached SCSI receive path 514, a serializer 516, an FTL/FM subsystem 518, an indirection table 520, a buffer RAM 522, a Serial Attached SCSI direct memory access data path engine queue 524, a Command Performance Statistics Monitor 526, an ISHWO workload detector 528, an ISHWO host device performance monitor 530, and an ISHWO governor 532. The NAND gates 504 includes a NAND gate group 534, a NAND gate group 536, a NAND gate group 538, and a NAND gate group 540.

The NAND gates 504 may receive processed data from the FTL/FM subsystem 518 and return a data output. The NAND gates 504 may include logic to determine which of the NAND gate groups to utilize to generate the data outputs, which are sent to the FTL/FM subsystem 518.

The physical layer 506, the physical layer 508, and the physical layer 510, as well as any number of physical layers interact with the host device on a physical level to send and receive data and commands. The physical layers also send control signals to the ISHWO host device performance monitor 530 regarding host device performance measurements, including command turnaround time (ns), host data turnaround time (ns), command-to-command turnaround time (ns), open connection time (ns), and Serial Attached SCSI credit turnaround time (ns). The physical layers further send and receive data and commands from the Serial Attached SCSI port logic 512.

The Serial Attached SCSI port logic 512 prioritizes which of the physical layers to utilize during a data or command transfer to the host device. The Serial Attached SCSI port logic 512 may be configured by the Serial Attached SCSI direct memory access data path engine queue 524 regarding delays in sending and reporting sent and received data and commands. The Serial Attached SCSI port logic 512 further sends incoming data for NAND processing to the Serial Attached SCSI receive path 514.

The Serial Attached SCSI receive path 514 receives data for NAND processing from the Serial Attached SCSI port logic 512. The data is then sent to a serializer 516. The Serial Attached SCSI receive path 514 further sends control signals regarding workload to the Command Performance Statistics Monitor 526. The workload attributes may include percentage read, a queue depth, a percentage random, a transfer length, an initiator count, a port count, and input/outputs per second (IOPS).

The serializer 516 receives the data from the Serial Attached SCSI receive path 514. The serializer 516 performs the process of preparing data structures for command execution (e.g. logical block address overlap check, encryption key lookup, stream lookup) and ensuring commands are dispatched for execution to the FTL/FM subsystem 518 in the correct order. The serializer 516 may be influenced by a control signal from the ISHWO governor 532. Such a control signal may influence the flash translation layer queue depth. The processed data is then sent to the FTL/FM subsystem 518. In some embodiments, the processed data alters the flash translation layer queue depth of the FTL/FM subsystem 518, altering the number of commands the FTL/FM subsystem 518 is concurrently processing.

The FTL/FM subsystem 518 receives the processed data as well as the control signal to determine the flash translation layer queue depth. The FTL/FM subsystem 518 may interact via control signals with the indirection table 520 to determine the address to send data and commands to the NAND gates 504 and the buffer RAM 522. The FTL/FM subsystem 518 may then send data and commands to the NAND gates 504 and the buffer RAM 522. The FTL/FM subsystem 518 also receives the data outputs from the NAND gates 504.

The indirection table 520 stores address locations for various components of the solid state drive 500 to be utilized by the FTL/FM subsystem 518.

The buffer RAM 522 may send and receive data (processed data, data outputs, etc.) from the FTL/FM subsystem 518 and the Serial Attached SCSI direct memory access data path engine queue 524. The buffer RAM 522 is a region of a physical memory storage used to temporarily store data while it is being moved from one place to another. For example, the buffer RAM 522 may store processed data that is not actively queued in the FTL/FM subsystem 518 and send further processed data upon request by the FTL/FM subsystem 518. The FTL/FM subsystem 518 may perform a similar process for data outputs for the Serial Attached SCSI direct memory access data path engine queue 524.

The Serial Attached SCSI direct memory access data path engine queue 524 determines the scheduling of host device data transfers (e.g., of data outputs) and the scheduling of host device responses. The Serial Attached SCSI direct memory access data path engine queue 524 communicates with the Serial Attached SCSI port logic 512 to send and receive this data and commands. The scheduling of the host device data transfers and the host device responses may be influenced by control signals from the ISHWO governor 532. The Serial Attached SCSI direct memory access data path engine queue 524 may be altered by the control signals to delay the data transfers or the response frames. The Serial Attached SCSI direct memory access data path engine queue 524 further sends control signals regarding workload to the Command Performance Statistics Monitor 526. The workload attributes may include percentage read, a queue depth, a percentage random, a transfer length, an initiator count, a port count, and input/outputs per second (IOPS).

The Command Performance Statistics Monitor 526 receives the workload attributes from the Serial Attached SCSI receive path 514 and the Serial Attached SCSI direct memory access data path engine queue 524. The workload attributes are then sent to the ISHWO workload detector 528.

The ISHWO workload detector 528 receives the workload attributes from the Command Performance Statistics Monitor 526. The ISHWO workload detector 528 then determines a workload type by achieving a workload type lock. Once a workload type lock has occurred or a new workload type lock has occurred, the ISHWO workload detector 528 sends a control signal to the ISHWO host device performance monitor 530 to initiate a new host device performance measurement. The ISHWO workload detector 528 may also send a control signal to the ISHWO governor 532 that may include the host device perfection factor and the workload attributes (or the average workload attributes). The ISHWO workload detector 528 may be operated in accordance with the process depicted in FIG. 2.

The ISHWO host device performance monitor 530 receives the control signal to initiate a new host device performance measurement. The ISHWO host device performance monitor 530 also receives control signals from the physical layers that may include the host performance attributes. The ISHWO host device performance monitor 530 may collect the host performance attributes for a host performance measurement duration. The ISHWO host device performance monitor 530 may then log the final host device performance measurement, which may include an average value for the host device performance measurements. The ISHWO host device performance monitor 530 sends a control signal, which may include the final host device performance measurement log, to the ISHWO governor 532. The ISHWO host device performance monitor 530 may be operated in accordance with the process depicted in FIG. 1.

The ISHWO governor 532 receives the final host device performance measurement log from the ISHWO host device performance monitor 530 and the host device perfection factor from the ISHWO workload detector 528. The ISHWO governor 532 then determines whether to adjust the global effective flash translation layer queue depth, the individual initiator delays for host data transfers, or the command status responses, or to make no adjustments. The ISHWO governor 532 sends a control signal to the serializer 516 to adjust the global effective flash translation layer queue depth. The ISHWO governor 532 sends a control signal to the Serial Attached SCSI direct memory access data path engine queue 524 to adjust the individual initiator delays for host data transfers or the command status responses. Additionally, if an adjustment is made, the ISHWO governor 532 may initiate a new host device performance measurement by the ISHWO host device performance monitor 530. The ISHWO governor 532 records a log file to include the results and any new ISHWO settings. The ISHWO governor 532 may be operated in accordance with the process depicted in FIG. 3.

Figure 6:
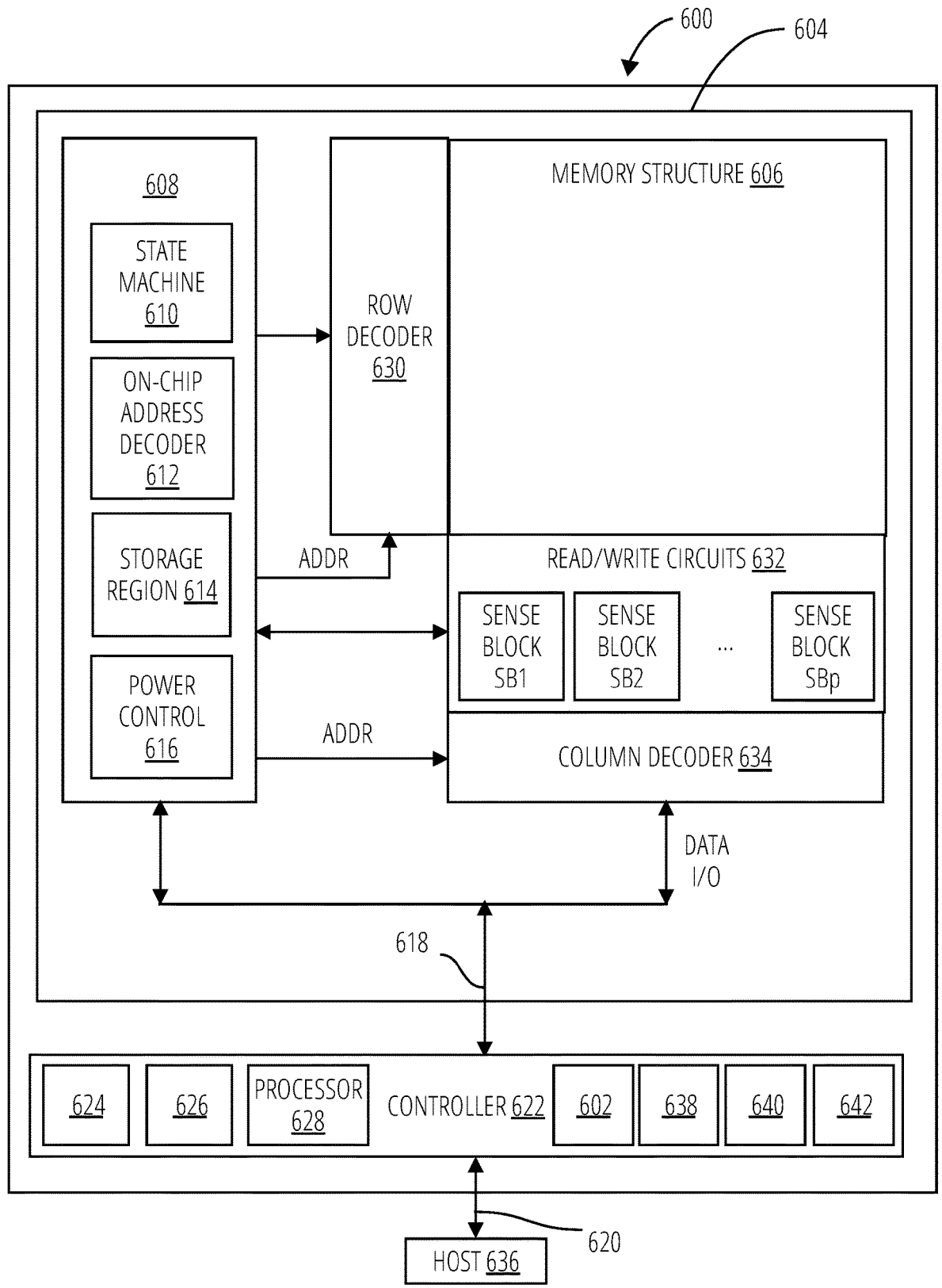
FIG. 6 is a block diagram of an example memory device 600.

FIG. 6 is a block diagram of an exemplary memory device 600. The memory device 600 may include one or more memory die 604. The memory die 604 includes a memory structure 606 of memory cells, such as an array of memory cells herein referred to as a memory array, an address controller 608, and read/write circuits 632. The memory structure 606 is addressable by word lines via a row decoder 630 and by bit lines via a column decoder 634. The read/write circuits 632 include multiple sense blocks SB1, SB2, . . . , SBp (sensing circuitry) and allow a page of memory cells to be read or programmed in parallel. Typically a read/write controller 622 is included in the same memory device 600 (e.g., a removable storage card) as the one or more memory die 604. Commands and data are transferred between the host device 636 and read/write controller 622 via a data bus 620, and between the controller and the one or more memory die 604 via lines 618.

The memory structure 606 can be 2D (laid out in a single fabrication plane) or 3D (laid out in multiple fabrication planes). The memory structure 606 may comprise one or more array of memory cells including a 3D array. In one embodiment, the memory structure 606 may comprise a monolithic three-dimensional memory structure (3D array) in which multiple memory levels are formed above (and not in) a single substrate, such as a wafer, with no intervening substrates. The memory structure 606 may comprise any type of non-volatile memory that is monolithically formed in one or more physical levels of arrays of memory cells having an active area disposed above a silicon substrate. The memory structure 606 may be in a non-volatile memory device having circuitry associated with the operation of the memory cells, whether the associated circuitry is above or within the substrate.

The address controller 608 cooperates with the read/write circuits 632 to perform memory operations on memory cells of the memory structure 606, and includes a state machine 610, an address decoder 612, a store region selector 614, and a power control 616. The state machine 610 provides chip-level control of memory operations. A store region selector 614 may be provided, e.g., for programming parameters as described further below.

The address decoder 612 provides an address interface between that used by the host or a read/write controller 622 to the hardware address used by the row decoder 630 and column decoder 634. The power control 616 controls the power and voltages supplied to the various control lines during memory operations. The power control 616 and/or read/write circuits 632 can include drivers for word lines, source gate select (SGS) transistors, drain gate select (DGS) transistors, bit lines, substrates (in 2D memory structures), charge pumps, and source lines. The power control 616 can therefore include various first voltage generators (e.g., the drivers) to generate the voltages described herein. The sense blocks can include bit line drivers and sense amplifiers in one approach.

In some implementations, some of the components can be combined. In various designs, one or more of the components (alone or in combination), other than memory structure 606, can be thought of as at least one control circuit or controller which is configured to perform the techniques described herein. For example, a control circuit may include any one of, or a combination of, address controller 608, state machine 610, address decoder 612, column decoder 634, power control 616, control processor 628, error correction unit 602, sense blocks SB1, SB2, . . . , SBp, read/write circuits 632, read/write controller 622, and so forth.

The read/write controller 622 may comprise a control processor 628, memory devices (memory) such as controller read-only memory 624 and controller volatile memory 626, and other functional units known in the art such as a temperature controller 638 to adjust the operational behavior of the memory device 600 based on ambient temperature.

The memory devices of the read/write controller 622 may comprise code such as a set of instructions, and the control processor 628 is operable to execute the set of instructions to provide aspects of the functionality described herein. Alternatively or additionally, the control processor 628 can access code from the memory structure 606, such as a reserved area of memory cells in one or more word lines.

For example, code can be used by the read/write controller 622 to access the memory structure 606 for programming (write), read, and reset operations. The code can include boot code and control code (e.g., set of instructions). The boot code is software that initializes the read/write controller 622 during a booting or startup process and enables the read/write controller 622 to access the memory structure 606. The code can be used by the read/write controller 622 to control one or more memory structures. In one embodiment, upon being powered up, the control processor 628 fetches the boot code from the controller read-only memory 624 or memory structure 606 for execution, and the boot code initializes the system components and loads the control code into the controller volatile memory 626. Once the control code is loaded into the controller volatile memory 626, it is executed by the control processor 628. The control code includes drivers to perform basic tasks such as controlling and allocating memory, prioritizing the processing of instructions, and controlling input and output ports.

As noted prior the read/write controller 622 may dynamically evaluate the memory host device workload characteristics and apply settings for the flash translation layer 640 or the Serial Attached SCSI interface 642 accordingly. Generally, the read/write controller 622 may be configured to perform the functions described herein including the workload execution profile process 100, the workload execution profile process 200 and the input/output device control process 300 discussed previously, and provide the input/output device controls 400 discussed previously. The control code can implement a sequencer to control the timing (start and stop times, durations, spacing etc.) of the various actions described herein.

Although only a single flash translation layer 640 or Serial Attached SCSI interface 642 is illustrated, there may be multiple ones that are not necessarily contiguous addresses in physical memory. The mode page described previously may be implemented for example in the controller read-only memory 624 or controller volatile memory 626.

In one embodiment, the host device 636 is a computing device (e.g., laptop, desktop, smartphone, tablet, digital camera) that includes one or more processors, one or more processor readable storage devices (RAM, ROM, flash memory, hard disk drive, solid state memory) that store processor readable code (e.g., software) for programming the read/write controller 622 to perform the methods described herein. The host may also include additional system memory, one or more input/output interfaces and/or one or more input/output devices in communication with the one or more processors, as well as other components well known in the art.

The store region selector 614 may be a non-volatile memory such as NAND flash memory, or another type, implementing a memory map or address translation table. The store region selector 614 may select the flash translation layer 640 or the Serial Attached SCSI interface 642 in response to the flash translation layer 640 or the Serial Attached SCSI interface 642 detecting a burst write operation from the host device 636.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the disclosed techniques and devices are not limited to the two-dimensional and three-dimensional exemplary structures described but covers all relevant memory structures within the spirit and scope of the technology as described herein and as understood by one of skill in the art.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method of operating an input/output device, the method comprising:

the input/output device interacting with a host device workload execution profiler to achieve a workload type lock;

the input/output device correlating the workload type lock to a workload type;

comparing a host device workload threshold with one or more host perfection scores;

wherein the host perfection scores are calculated for each data input or data output initiator of the host device using a ranking mechanism;

wherein each host perfection score is determined by:

$$(W1*A1)+(W2*A2)+ \ldots +(Wn*An)$$

where A1, A2, through An are host measurement attributes and W1, W2, through Wn are relative weight factors applied to each of the host measurement attributes and wherein the sum of the relative weight factors is 100%; and the input/output device altering settings for the workload type to affect one of a flash translation layer queue depth, a host device data transfer scheduler, and a command status host notification timing to a host device, based on the host perfection scores.

2. The method of claim 1, further comprising measuring a difference between an actual performance measure for the workload type and an optimal performance for the workload type.

3. The method of claim 1, further comprising:

evaluating and scoring changes to performance of the host device related to changes to prior control settings for the input/output device; and adjusting weights applied for selection of future control settings for the input/output device based on the scoring of the changes.

4. The method of claim 1, further comprising:

making a first determination whether to alter a queue depth of a flash translation layer of the input/output device based on the host perfection scores.

5. The method of claim 4, further comprising:

making a second determination, subsequent to the first determination, whether delays for host data transfers should be altered based on the host perfection scores.

6. The method of claim 5, further comprising:

making a third determination, subsequent to the second determination, whether command status responses to the host device should be delayed based on the host perfection scores.

7. A solid state drive comprising:

a read data request and write data request interface to a host device; and a controller configured to:

identify a workload type for the host device based at least in part on activity on the interface to the host device;

compare a host device workload threshold with one or more host perfection scores;

calculate the host perfection scores for each data input or data output initiator of the host device using a ranking mechanism;

wherein the host perfection scores are determined by:

$$(W1*A1)+(W2*A2)+ \ldots +(Wn*An)$$

where A1, A2, through An are host measurement attributes and W1, W2, through Wn are relative weight factors applied to each host measurement attribute and wherein the sum of the relative weight factors is 100%; and alter settings for the workload type to first affect a flash translation layer queue depth of the solid state drive, to second affect a host device data transfer scheduler of the solid state drive, and to third effect a command status host notification timing by the solid state drive to the host device, based on the host perfection scores.

8. The solid state drive of claim 7, further comprising:
the controller configured to apply changes to performance of the host device related to changes to the settings to adjust machine learning weights applied for selection of future control settings for the solid state drive for the workload type.

9. The solid state drive of claim 7, further comprising:
a mode page comprising workload descriptors for the workload type; and
the controller configured to utilize the mode page to determine host performance attributes for the workload type.

10. The solid state drive of claim 9, wherein the host performance attributes include one or more of command turnaround time, host data turnaround time, command-to-command turnaround time, open connection time, and Serial Attached SCSI credit turnaround time.

11. An input/output device for a host device, the input/output device comprising:
a host device interface;
logic to operate a host device workload execution profiler in conjunction with the host device interface to obtain a workload type lock;
logic to correlate the workload type lock to a workload type;
logic to compare a host device workload threshold with one or more host perfection scores;
wherein the host perfection scores are calculated for each data input or data output initiator of the host device using a ranking mechanism;
wherein the host perfection score is determined by:

$$(W1*A1)+(W2*A2)+\ldots+(Wn*An)$$

where A1, A2, through An are host measurement attributes and W1, W2, through Wn are relative weight factors applied to each host measurement attribute and wherein the sum of the relative weight factors is 100%; and
logic to alter settings for the workload type to affect one or more of a flash translation layer queue depth of the input/output device, a host device data transfer scheduler of the input/output device, and a command status host notification timing by the input/output device to the host device, based on the host perfection scores.

12. The input/output device of claim 11, further comprising logic to determine a difference between an actual performance measure for the workload type and an optimal performance for the workload type.

13. The input/output device of claim 11, further comprising:
logic to determine scores for changes to performance of the host device related to changes to prior control settings for the input/output device; and
logic to adjust weights applied for selection of future control settings for the input/output device based on the scores.

14. The input/output device of claim 11, further comprising:
logic to make a first determination whether to alter a queue depth of a flash translation layer of the input/output device based on the host perfection scores; and
logic to make a second determination whether delays for host data transfers should be altered based on the host perfection scores, the second determination made on condition that that the queue depth is not altered.

15. The input/output device of claim 14, further comprising:
logic to make a third determination whether command status responses to the host device should be delayed based on the host perfection scores, the third determination made on condition that the delays for host data transfers are not altered.

* * * * *